US010857758B2

(12) United States Patent
Doi et al.

(10) Patent No.: US 10,857,758 B2
(45) Date of Patent: Dec. 8, 2020

(54) SILICONE FOAM SHEET AND METHOD OF PRODUCING THE SAME

(71) Applicants: NITTO DENKO CORPORATION, Ibaraki (JP); DOW TORAY CO., LTD., Tokyo (JP)

(72) Inventors: Kohei Doi, Ibaraki (JP); Toru Iseki, Ibaraki (JP); Akihiro Nakamura, Ichihara (JP); Syuji Endo, Ichihara (JP)

(73) Assignees: NITTO DENKO CORPORATION, Ibaraki (JP); DOW TORAY CO., LTD., Tokyo (JP)

( * ) Notice: Subject to any disclaimer, the term of this patent is extended or adjusted under 35 U.S.C. 154(b) by 95 days.

(21) Appl. No.: 16/064,364

(22) PCT Filed: Dec. 16, 2016

(86) PCT No.: PCT/JP2016/087574
§ 371 (c)(1),
(2) Date: Jun. 20, 2018

(87) PCT Pub. No.: WO2017/110681
PCT Pub. Date: Jun. 29, 2017

(65) Prior Publication Data
US 2019/0001618 A1    Jan. 3, 2019

(30) Foreign Application Priority Data

Dec. 25, 2015 (JP) ................. 2015-252913

(51) Int. Cl.
| | |
|---|---|
| B32B 5/18 | (2006.01) |
| C08J 9/28 | (2006.01) |
| B32B 27/00 | (2006.01) |
| C08J 9/00 | (2006.01) |
| C09J 7/38 | (2018.01) |
| C09J 7/26 | (2018.01) |
| B29C 44/02 | (2006.01) |
| B29C 44/34 | (2006.01) |
| B29K 83/00 | (2006.01) |
| B29L 7/00 | (2006.01) |

(52) U.S. Cl.
CPC ............... *B32B 5/18* (2013.01); *B29C 44/02* (2013.01); *B29C 44/3415* (2013.01); *B32B 27/00* (2013.01); *C08J 9/0061* (2013.01); *C08J 9/28* (2013.01); *C09J 7/26* (2018.01); *C09J 7/38* (2018.01); *B29K 2083/00* (2013.01); *B29L 2007/002* (2013.01); *B32B 2266/0214* (2013.01); *B32B 2266/06* (2013.01); *B32B 2405/00* (2013.01); *C08J 9/0066* (2013.01); *C08J 2201/026* (2013.01); *C08J 2201/04* (2013.01); *C08J 2205/044* (2013.01); *C08J 2205/05* (2013.01); *C08J 2207/02* (2013.01); *C08J 2383/07* (2013.01); *C09J 2483/006* (2013.01)

(58) Field of Classification Search
None
See application file for complete search history.

(56) References Cited

U.S. PATENT DOCUMENTS

| | | | |
|---|---|---|---|
| 7,687,563 B2 | 3/2010 | Shirasaki et al. | |
| 7,732,519 B2 | 6/2010 | Shirasaki et al. | |
| 9,051,445 B2 | 6/2015 | Nozoe et al. | |
| 9,375,901 B2 | 6/2016 | Lee et al. | |
| 2007/0123628 A1 | 5/2007 | Shirasaki et al. | |
| 2008/0021125 A1 | 1/2008 | Shirasaki et al. | |
| 2009/0292056 A1 | 11/2009 | Shirasaki et al. | |
| 2010/0098453 A1* | 4/2010 | Goebel .............. | G03G 15/0225 399/100 |
| 2010/0208189 A1 | 8/2010 | Takanashi | |
| 2011/0021649 A1 | 1/2011 | Sakuma et al. | |
| 2011/0190410 A1 | 8/2011 | Nozoe et al. | |
| 2015/0107669 A1 | 4/2015 | Gotoh et al. | |

(Continued)

FOREIGN PATENT DOCUMENTS

| | | |
|---|---|---|
| CN | 101663358 A | 3/2010 |
| CN | 101809109 A | 8/2010 |

(Continued)

OTHER PUBLICATIONS

Sawada, M. et al., Silicone Rubber Sponge Composition and Sponge Body, Sep. 26, 2013, machine translation of JP2013-189496A (Year: 2013).*
The extended European search report dated Apr. 3, 2019 for corresponding European Application No. 16878570.7.
International Search Report for corresponding international application PCT/JP2016/087574 dated Feb. 7, 2017.
Office Action issued for corresponding Chinese Patent Application No. 201680076276.5 dated Aug. 25, 2020, along with an English translation, citing above references.

(Continued)

*Primary Examiner* — Chinessa T. Golden
(74) *Attorney, Agent, or Firm* — Hauptman Ham, LLP

(57) ABSTRACT

Provided is a silicone foam sheet that expresses excellent bubble removability, that has satisfactory adhesiveness with an adherend and satisfactory sealability, that maintains the expression of these effects even when its thickness is reduced, that preferably expresses a stable modulus of elasticity over a region from a low-temperature region to a high-temperature region, and that suppresses both of its compression set in the low-temperature region and its compression set in the high-temperature region to low levels. Also provided is a method of producing such silicone foam sheet. The silicone foam sheet comprises an open-cell structure having a thickness of from 10 μm to 3,000 μm, wherein an open-cell ratio is 90% or more, an average cell diameter of the silicone foam sheet is from 1 μm to 50 μm, and 90% or more of all cells therein each has a cell diameter of 80 μm or less.

11 Claims, No Drawings

(56) References Cited

U.S. PATENT DOCUMENTS

| | | | |
|---|---|---|---|
| 2015/0213920 A1* | 7/2015 | Lee | B32B 5/18 |
| | | | 428/71 |
| 2016/0053069 A1 | 2/2016 | Gotoh et al. | |
| 2017/0040478 A1 | 2/2017 | Gotoh et al. | |

FOREIGN PATENT DOCUMENTS

| | | | | |
|---|---|---|---|---|
| CN | 102112556 | A | 6/2011 | |
| CN | 103987767 | A | 8/2014 | |
| CN | 104334673 | A | 2/2015 | |
| CN | 104802465 | A | 7/2015 | |
| EP | 2311912 | A1 | 4/2011 | |
| EP | 2792706 | A1 * | 10/2014 | ......... C08G 18/4837 |
| JP | 2004-346248 | A | 12/2004 | |
| JP | 2008-214625 | A | 9/2008 | |
| JP | 2013-189496 | A | 9/2013 | |
| JP | 2013189496 | A * | 9/2013 | |
| JP | 2014-001362 | A | 1/2014 | |
| JP | 2014-167067 | A | 9/2014 | |
| JP | 5702899 | B2 | 4/2015 | |

\* cited by examiner

SILICONE FOAM SHEET AND METHOD OF PRODUCING THE SAME

CROSS REFERENCE TO RELATED APPLICATIONS

This application claims the priority of Japanese Patent Application No. 2015-252913, filed on Dec. 25, 2015, in the Japanese Patent Office. Further, this application is the National Phase application of International Application No. PCT/JP2016/087574 filed on Dec. 16, 2016, which is incorporated herein by reference in its entirety.

TECHNICAL FIELD

The present invention relates to a silicone foam sheet. The present invention also relates to a method of producing a silicone foam sheet. The present invention further relates to a silicone foam sheet composite including the silicone foam sheet of the present invention.

BACKGROUND ART

A silicone foam has a light weight, is excellent in heat resistance and weatherability, and has a low thermal conductivity, and hence has been used as a foam material required to have these characteristics.

For example, there have been reported a silicone resin foam that contains a silicone resin cured product, and a plurality of particles dispersed in the silicone resin cured product and having cavity portions therein, and that is suitably used in a solar cell application (Patent Literature 1), and a silicone foam sheet in which cells are densely arranged, the uniformity of the sizes of the cells is high, the shapes of the cells are satisfactory, and a closed-cell ratio is high (Patent Literature 2).

However, the related-art silicone foam cannot but be used for limited purposes because it is not easy to form the silicone foam into a sheet having a small thickness.

In addition, the silicone foam sheet described in Patent Literature 2 is formed from a UV-curable silicone resin, and hence involves a problem in that the range of choice of materials therefor is narrow and a problem in that the sheet is expensive.

Further, the related-art silicone foam has a high closed-cell ratio, and hence involves a problem in that its bubble removability is poor and a problem in that its surface is liable to be rough. Accordingly, in the related-art silicone foam, adhesiveness reduces and sealability cannot be satisfactorily expressed.

CITATION LIST

Patent Literature

[PTL 1] JP 5702899 B2
[PTL 2] JP 2014-167067 A

SUMMARY OF INVENTION

Technical Problem

An object of the present invention is to provide a silicone foam sheet that can express excellent bubble removability, that has satisfactory adhesiveness with an adherend, that has satisfactory sealability, that can maintain the expression of these effects even when its thickness is reduced, that can preferably express a stable modulus of elasticity over a region from a low-temperature region to a high-temperature region, and that can suppress both of its compression set in the low-temperature region and its compression set in the high-temperature region to low levels. Another object of the present invention is to provide a silicone foam sheet composite including such silicone foam sheet. Still another object of the present invention is to provide a method of producing such silicone foam sheet.

Solution to Problem

According to one embodiment of the present invention, there is provided a silicone foam sheet having a thickness of from 10 µm to 3,000 µm, wherein the silicone foam sheet has an open-cell structure, wherein an open-cell ratio of the silicone foam sheet is 90% or more, wherein an average cell diameter of the silicone foam sheet is from 1 µm to 50 µm, and wherein 90% or more of all cells in the silicone foam sheet each have a cell diameter of 80 µm or less.

In one embodiment, the thickness is less than 800 µm.

In one embodiment, a storage modulus of elasticity of the silicone foam sheet in a range of from −30° C. to 150° C. falls within a range of from −200% to +200% with respect to a storage modulus of elasticity of the silicone foam sheet at 20° C.

In one embodiment, both a compression set of the silicone foam sheet at −30° C. and a compression set of the silicone foam sheet at 150° C. are 50% or less.

In one embodiment, a shear adhesive strength (23° C., tensile rate: 50 mm/min) of the silicone foam sheet with a SUS304BA plate is 1 N/100 mm$^2$ or more.

In one embodiment, the silicone foam sheet is formed by heat curing of a silicone resin composition.

In one embodiment, the silicone resin composition includes at least: (A) 100 parts by mass of an organopolysiloxane having at least two alkenyl groups in a molecule thereof; (B) an organopolysiloxane having at least two silicon atom-bonded hydrogen atoms in a molecule thereof in such an amount that a number of moles of the silicon atom-bonded hydrogen atoms in the component (B) is from 0.4 mol to 20 mol with respect to 1 mol of the alkenyl groups in the component (A); (C) 100 parts by mass to 1,000 parts by mass of a mixture including water and an inorganic thickener; (D) 0.1 part by mass to 15 parts by mass of surfactants including (D-1) a nonionic surfactant having an HLB value of 3 or more and (D-2) a nonionic surfactant having an HLB value of less than 3, provided that a mass ratio of the component (D-1) to the component (D-2) is at least 1; (E) a hydrosilylation reaction catalyst; and (F) 0.001 part by mass to 5 parts by mass of a curing retarder.

According to one embodiment of the present invention, there is provided a silicone foam sheet composite, including a support on at least one surface side of the silicone foam sheet according to the embodiment of the present invention.

In one embodiment, the support includes a release liner.

In one embodiment, a peel strength of the release liner at a peel angle of 180° and a tensile rate of 300 mm/min is 1 N/50 mm or less at 23° C.

According to one embodiment of the present invention, there is provided a silicone foam sheet composite, including a pressure-sensitive adhesive layer on at least one surface side of the silicone foam sheet according to the embodiment of the present invention.

According to one embodiment of the present invention, there is provided a silicone foam sheet composite, including: a support on at least one surface side of the silicone foam sheet according to the embodiment of the present invention; and a pressure-sensitive adhesive layer on another surface of the support.

According to one embodiment of the present invention, there is provided a silicone foam sheet composite, including: a pressure-sensitive adhesive layer on at least one surface side of the silicone foam sheet according to the embodiment of the present invention; and a support on another surface of the pressure-sensitive adhesive layer.

In one embodiment, the silicone foam sheet composite is wound into a roll.

According to one embodiment of the present invention, there is provided a method of producing a silicone foam sheet having a thickness of from 10 µm to 3,000 µm, including: applying a silicone resin composition containing at least a thermosetting silicone resin and water onto a base material A; mounting a base material B on a surface of the applied silicone resin composition opposite to the base material A; thermally curing the silicone resin composition; and removing the base material A and/or the base material B, followed by heat drying to form the silicone foam sheet.

In one embodiment, the method of producing a silicone foam sheet according to the embodiment of the present invention includes producing the silicone foam sheet according to the embodiment of the present invention.

According to one embodiment of the present invention, there is provided a method of producing a silicone foam sheet having a thickness of from 10 µm to 3,000 µm, including: applying a silicone resin composition containing at least a thermosetting silicone resin and water onto a base material A; mounting a base material B on a surface of the applied silicone resin composition opposite to the base material A; thermally curing the silicone resin composition; removing the base material A and/or the base material B, followed by heat drying; and bonding the resultant to a support to form the silicone foam sheet.

In one embodiment, the method of producing a silicone foam sheet according to the embodiment of the present invention includes producing the silicone foam sheet according to the embodiment of the present invention.

Advantageous Effects of Invention

According to the present invention, the silicone foam sheet that can express excellent bubble removability, that has satisfactory adhesiveness with an adherend, that has satisfactory sealability, that can maintain the expression of these effects even when its thickness is reduced, that can preferably express a stable modulus of elasticity over a region from a low-temperature region to a high-temperature region, and that can suppress both of its compression set in the low-temperature region and its compression set in the high-temperature region to low levels can be provided. The silicone foam sheet composite including such silicone foam sheet can also be provided. The method of producing such silicone foam sheet can also be provided.

DESCRIPTION OF EMBODIMENTS

<<1. Silicone Foam Sheet>>

The thickness of a silicone foam sheet of the present invention is from 10 µm to 3,000 µm. The thickness of the silicone foam sheet of the present invention may be large, or the thickness may be small in accordance with its use purposes. However, in consideration of the fact that it is not easy to form the related-art silicone foam into a sheet having a small thickness, the value of the silicone foam sheet of the present invention having a small thickness lies in that the sheet can be used for purposes to which the related-art silicone foam has been inapplicable. On the basis of the foregoing, the thickness of the silicone foam sheet of the present invention is preferably 10 µm or more and less than 800 µm, more preferably from 20 µm to 750 µm, still more preferably from 30 µm to 700 µm, particularly preferably from 40 µm to 650 µm, most preferably from 50 µm to 600 µm. The silicone foam sheet of the present invention can maintain the expression of any other effect of the present invention even when its thickness is reduced as described above.

The silicone foam sheet of the present invention has cells (spherical bubbles). The cells (spherical bubbles) may not be strictly spherical bubbles, and may be, for example, substantially spherical bubbles partially having strains or bubbles formed of spaces having large strains.

The silicone foam sheet of the present invention has an open-cell structure. That is, the silicone foam sheet of the present invention has an open-cell structure having a through-hole between adjacent cells. When the silicone foam sheet of the present invention has the open-cell structure, through the combination of this feature with any other feature of the silicone foam sheet of the present invention, the sheet can express excellent bubble removability, has satisfactory adhesiveness with an adherend, has satisfactory sealability, and can maintain the expression of these effects even when its thickness is reduced.

The open-cell ratio of the silicone foam sheet of the present invention is 90% or more, preferably from 90% to 100%, more preferably from 92% to 100%, still more preferably from 95% to 100%, particularly preferably from 97% to 100%, most preferably substantially 100%. When the open-cell ratio in the silicone foam sheet of the present invention falls within the range, through the combination of this feature with any other feature of the silicone foam sheet of the present invention, the sheet can express excellent bubble removability, has satisfactory adhesiveness with an adherend, has satisfactory sealability, and can maintain the expression of these effects even when its thickness is reduced. A method of measuring the open-cell ratio is described later.

The average cell diameter of the silicone foam sheet of the present invention is from 1 µm to 50 µm, preferably from 1 µm to 40 µm, more preferably from 1 µm to 35 µm, still more preferably from 1 µm to 30 µm, particularly preferably from 1 µm to 25 µm, most preferably from 1 µm to 20 µm. When the average cell diameter in the silicone foam sheet of the present invention falls within the range, through the combination of this feature with any other feature of the silicone foam sheet of the present invention, the sheet can express excellent bubble removability, has satisfactory adhesiveness with an adherend, and has satisfactory sealability. In addition, even when the thickness is reduced, the sheet has a small number of, for example, pinholes, keeps its in-plane uniformity, and can maintain the expression of those effects.

In the silicone foam sheet of the present invention, 90% or more of all cells each have a cell diameter of 80 µm or less. In the silicone foam sheet of the present invention, it is preferred that 92% or more of all the cells each have a cell diameter of 80 µm or less, it is more preferred that 95% or more of all the cells each have a cell diameter of 80 µm or less, it is still more preferred that 97% or more of all the cells each have a cell diameter of 80 µm or less, it is particularly preferred that 99% or more of all the cells each have a cell diameter of 80 µm or less, and it is most preferred that substantially 100% of all the cells each have a cell diameter of 80 µm or less. In addition, in the silicone foam sheet of the present invention, it is preferred that 90% or more of all the cells each have a cell diameter of 75 µm or less, it is more preferred that 90% or more of all the cells each have a cell diameter of 70 µm or less, it is still more preferred that 90% or more of all the cells each have a cell diameter of 65 µm or less, it is particularly preferred that 90% or more of all the cells each have a cell diameter of 60 µm or less, and it is most preferred that 90% or more of all the cells each have a cell diameter of 55 µm or less. When the ratio of cells each having a cell diameter of 80 µm or less in the silicone foam sheet of the present invention, and the cell diameter of each of 90% or more of all the cells therein fall within the ranges, through the combination of this feature with any other feature of the silicone foam sheet of the present invention, the sheet can express excellent bubble removability, has satisfactory adhesiveness with an adherend, and has satisfactory sealability. In addition, even when the thickness is reduced, the sheet has a small number of, for example, pinholes, keeps its in-plane uniformity, and can maintain the expression of those effects.

A maximum cell diameter in all the cells in the silicone foam sheet of the present invention is preferably 80 µm or less, more preferably 75 µm or less, still more preferably 70 µm or less, still further more preferably 65 µm or less, particularly preferably 60 µm or less, most preferably 55 µm or less. When the maximum cell diameter in all the cells in the silicone foam sheet of the present invention falls within the range, through the combination of this feature with any other feature of the silicone foam sheet of the present invention, the sheet can express more excellent bubble removability, has satisfactory adhesiveness with an adherend, and has more satisfactory sealability. In addition, even when the thickness is reduced, the sheet has a small number of, for example, pinholes, keeps its in-plane uniformity, and can maintain the expression of those effects to a larger extent.

A minimum cell diameter in all the cells in the silicone foam sheet of the present invention is preferably 30 µm or less, more preferably 25 µm or less, still more preferably 20 µm or less, still further more preferably 15 µm or less, particularly preferably 10 µm or less, most preferably 5 µm or less. When the minimum cell diameter in all the cells in the silicone foam sheet of the present invention falls within the range, through the combination of this feature with any other feature of the silicone foam sheet of the present invention, the sheet can express more excellent bubble removability, has satisfactory adhesiveness with an adherend, and has satisfactory sealability. In addition, even when the thickness is reduced, the sheet has a small number of, for example, pinholes, keeps its in-plane uniformity, and can maintain the expression of those effects to a larger extent.

In the silicone foam sheet of the present invention, a case in which "90% or more of all cells each have a cell diameter of 80 µm or less" is, for example, a case in which the maximum cell diameter in all the cells is 80 µm or less (i.e., a case in which 100% of all the cells each have a cell diameter of 80 µm or less), or a case in which the cell diameter of each of 90% or more of all the cells calculated from the maximum cell diameter, the minimum cell diameter, and the average cell diameter in all the cells is 80 µm or less. (The average cell diameter (µm) was determined by capturing an enlarged image of a section of the foam (foam sheet) with a low-vacuum scanning electron microscope ("S-3400N Scanning Electron Microscope," manufactured by Hitachi High-Tech Science Systems Corporation) and analyzing the image. The above-mentioned value was calculated by sampling 20 cells to be analyzed.)

The silicone foam sheet of the present invention has the open-cell structure and has fine cell diameters, and hence has satisfactory adhesiveness with an adherend, can adsorb to the adherend without causing the inclusion of bubbles, and can express satisfactory sealability. In addition, the silicone foam sheet of the present invention has excellent heat resistance, excellent cold resistance, and excellent weatherability, and hence can express its sealability under various environments.

The apparent density of the silicone foam sheet of the present invention is preferably from 0.10 g/cm$^3$ to 0.90 g/cm$^3$, more preferably from 0.15 g/cm$^3$ to 0.80 g/cm$^3$, still more preferably from 0.20 g/cm$^3$ to 0.75 g/cm$^3$, particularly preferably from 0.20 g/cm$^3$ to 0.70 g/cm$^3$. When the apparent density of the silicone foam sheet of the present invention falls within the range, through the combination of this feature with any other feature of the silicone foam sheet of the present invention, the sheet can express a more stable modulus of elasticity over a region from a low-temperature region to a high-temperature region, can suppress both of its compression set in the low-temperature region and its compression set in the high-temperature region to lower levels, can express more excellent bubble removability, has satisfactory adhesiveness with an adherend, has more satisfactory sealability, and can maintain the expression of these effects to a larger extent even when its thickness is reduced.

The silicone foam sheet of the present invention preferably has surface opening portions.

When the silicone foam sheet of the present invention has the surface opening portions, the silicone foam sheet of the present invention can express an excellent adhesive property by itself. This is probably because the surface opening portions serve as suckers. The average pore diameter of the surface opening portions is preferably from 0.01 µm to 50 µm, more preferably from 0.05 µm to 45 µm, still more preferably from 0.1 µm to 40 µm, particularly preferably from 0.2 µm to 35 µm, most preferably from 0.3 µm to 30 µm. When the average pore diameter of the surface opening portions falls within the range, the silicone foam sheet of the present invention can express a more excellent adhesive property by itself. In particular, the sheet can express an excellent effect in terms of a shear adhesive property. Thus, the sheet can express excellent adhesive properties with various adherends, such as a glass, a metal, and a plastic. Further, when the average pore diameter of the surface opening portions falls within the range, the sealability of the sheet can be more satisfactory.

The shear adhesive strength (measurement conditions: 23° C., tensile rate: 50 mm/min) of the silicone foam sheet of the present invention with a SUS304BA plate is preferably 1 N/100 mm$^2$ or more, more preferably 2 N/100 mm$^2$ or more, still more preferably 3 N/100 mm$^2$ or more, particularly preferably 5 N/100 mm$^2$ or more. In addition, an upper limit therefor, which is not particularly limited, is, for example, 100 N/100 mm$^2$. When the shear adhesive strength of at least one surface of the silicone foam sheet of the present invention with the SUS304BA plate is 1 N/100 mm$^2$ or more, in the case where the silicone foam sheet is used by being laminated on any other member, the following effect is obtained irrespective of its thickness: even when no pressure-sensitive adhesive or adhesive layer is arranged on the silicone foam sheet, the other member does not peel and the sealability is more satisfactory.

The storage modulus of elasticity of the silicone foam sheet of the present invention in the range of from −30° C.

to 150° C. preferably falls within the range of from −200% to +200%, more preferably falls within the range of from −150% to +150%, still more preferably falls within the range of from −100% to +100%, particularly preferably falls within the range of from −80% to +80%, and most preferably falls within the range of from −50% to +50% with respect to the storage modulus of elasticity thereof at 20° C. When the storage modulus of elasticity of the silicone foam sheet of the present invention in the range of from −30° C. to 150° C. falls within the range with respect to the storage modulus of elasticity thereof at 20° C., the silicone foam sheet of the present invention can express a more stable modulus of elasticity over a region from a low-temperature region to a high-temperature region.

Both the compression set of the silicone foam sheet of the present invention at −30° C. and the compression set thereof at 150° C. are preferably 50% or less, more preferably 40% or less, still more preferably 30% or less, particularly preferably 20% or less, most preferably 15% or less. When both the compression set of the silicone foam sheet of the present invention at −30° C. and the compression set thereof at 150° C. fall within the range, the silicone foam sheet of the present invention can suppress both of its compression set in a low-temperature region and its compression set in a high-temperature region to lower levels, in particular can suppress the compression set in the high-temperature region to a lower level, and hence can express more sufficient heat resistance.

The silicone foam sheet of the present invention is preferably formed by the heat curing of a silicone resin composition.

The silicone resin composition is preferably such a composition as described below.

The silicone resin composition includes at least: (A) 100 parts by mass of an organopolysiloxane having at least two alkenyl groups in a molecule thereof; (B) an organopolysiloxane having at least two silicon atom-bonded hydrogen atoms in a molecule thereof in such an amount that the number of moles of the silicon atom-bonded hydrogen atoms in the component (B) is from 0.4 mol to 20 mol with respect to 1 mol of the alkenyl groups in the component (A); (C) 100 parts by mass to 1,000 parts by mass of a mixture including water and an inorganic thickener; (D) 0.1 part by mass to 15 parts by mass of surfactants including (D-1) a nonionic surfactant having an HLB value of 3 or more and (D-2) a nonionic surfactant having an HLB value of less than 3, provided that the mass ratio of the component (D-1) to the component (D-2) is at least 1; (E) a hydrosilylation reaction catalyst; and (F) 0.001 part by mass to 5 parts by mass of a curing retarder.

The component (A) is the organopolysiloxane having at least two alkenyl groups in a molecule thereof, and is the main agent of the composition. Examples of the alkenyl groups in the component (A) include a vinyl group, an allyl group, and a hexenyl group. Of those, a vinyl group is preferred. In addition, examples of a silicon atom-bonded organic group except the alkenyl groups in the component (A) include: alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogen-substituted alkyl groups, such as a 3,3,3-trifluoropropyl group. Of those, a methyl group is preferred.

Specific examples of the component (A) include a dimethylpolysiloxane blocked with dimethylvinylsiloxy groups, a dimethylsiloxane-methylphenylsiloxane copolymer blocked with dimethylvinylsiloxy groups, a methylvinylpolysiloxane blocked with trimethylsiloxy groups, a dimethylsiloxane-methylvinylsiloxane copolymer blocked with trimethylsiloxy groups, and a dimethylsiloxane-methylvinylsiloxane-methylphenylsiloxane copolymer blocked with trimethylsiloxy groups. Of those, a diorganopolysiloxane having a substantially linear main chain is preferred.

The component (B) is the organopolysiloxane having at least two silicon atom-bonded hydrogen atoms in a molecule thereof, and is a cross-linking agent of the composition. The bonding positions of the silicon atom-bonded hydrogen atoms in the component (B) are not limited, and are, for example, a molecular chain terminal and/or a molecular chain side chain. Examples of a silicon atom-bonded organic group except the hydrogen atoms in the component (B) include: alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogen-substituted alkyl groups, such as a 3,3,3-trifluoropropyl group. Of those, a methyl group is preferred.

Examples of such component (B) include a dimethylpolysiloxane blocked with dimethylhydrogensiloxy groups, a dimethylsiloxane-methylhydrogensiloxane copolymer blocked with dimethylhydrogensiloxy groups, a methylhydrogenpolysiloxane blocked with trimethylsiloxy groups, a dimethylsiloxane-methylhydrogensiloxane copolymer blocked with trimethylsiloxy groups, and an organopolysiloxane including a siloxane unit represented by $(CH_3)_3SiO_{1/2}$, a siloxane unit represented by $H(CH_3)_2SiO_{1/2}$, and a siloxane unit represented by $SiO_{4/2}$. Of those, a linear organopolysiloxane is preferred.

The content of the component (B) is such an amount that the number of moles of the silicon atom-bonded hydrogen atoms in the component (B) falls within the range of from 0.4 mol to 20 mol with respect to 1 mol of the alkenyl groups in the component (A), preferably such an amount that the number falls within the range of from 1.5 mol to 20 mol, more preferably such an amount that the number falls within the range of from 1.5 mol to 10 mol. This is because when the number of moles of the silicon atom-bonded hydrogen atoms in the component (B) falls within the range, the compression set of a silicone rubber sponge to be obtained is improved.

The component (C) is the mixture including the water and the inorganic thickener, and is a component for providing a silicone rubber sponge through the removal of the water in the component (C) from a silicone rubber obtained by cross-linking the composition. The water in the component (C) is preferably ion-exchanged water because the component (C) is stably dispersed in the component (A).

The inorganic thickener in the component (C) is blended for increasing the viscosity of the water so that the component (C) may be easily dispersed in the component (A) and hence the state of dispersion of the component (C) may be stabilized. As the inorganic thickener, there are given natural or synthetic inorganic thickeners. Examples thereof include: natural or synthetic smectite clays, such as bentonite, montmorillonite, hectorite, saponite, sauconite, beidellite, and nontronite; magnesium aluminum silicate; and composites of those compounds and water-soluble organic polymers, such as a carboxyvinyl polymer. Of those, smectite clays, such as bentonite and montmorillonite, are preferred. For example, SUMECTON SA (manufactured by Kunimine Industries Co., Ltd.) serving as a hydrothermally synthesized product or BENGEL (manufactured by Hojun Co., Ltd.) serving as a naturally purified product is available as such smectite clay. The pH of such smectite clay preferably falls within the range of from 5.0 to 9.0 in terms of the maintenance of the heat resistance of the silicone rubber sponge. In addition, the content of the inorganic thickener in the component (C) preferably falls within the range of from 0.1 part by mass to 10 parts by mass, and more preferably falls within the range of from 0.5 part by mass to 5 parts by mass with respect to 100 parts by mass of the water.

The content of the component (C) falls within the range of from 100 parts by mass to 1,000 parts by mass, preferably falls within the range of from 100 parts by mass to 800 parts by mass, more preferably falls within the range of from 100 parts by mass to 500 parts by mass, still more preferably falls within the range of from 200 parts by mass to 500 parts by mass, and particularly preferably falls within the range of from 200 parts by mass to 350 parts by mass with respect to 100 parts by mass of the component (A). This is because of the following reasons: when the content of the component (C) is equal to or more than a lower limit for the range, a low-density silicone rubber sponge can be formed; meanwhile, when the content is equal to or less than an upper limit for the range, a sponge having a uniform and fine open-cell structure can be formed.

The surfactants serving as the component (D) include (D-1) the nonionic surfactant having an HLB value of 3 or more and (D-2) the nonionic surfactant having an HLB value of less than 3. Examples of the surfactants serving as the component (D) include a glycerin fatty acid ester, a polyglycerin fatty acid ester, a sorbitan fatty acid ester, a sucrose fatty acid ester, a polyethylene glycol fatty acid ester, a polypropylene glycol fatty acid ester, a polyoxyethylene glycerin fatty acid ester, a polyoxyethylene sorbitan fatty acid ester, a polyoxyethylene-polyoxypropylene block copolymer, a polyoxyethylene alkyl ether, a polyoxyethylene alkyl phenyl ether, and a polyoxyethylene fatty acid amide.

The component (D) includes the component (D-1) and the component (D-2), and the mass ratio of the component (D-1) to the component (D-2) is at least 1, preferably at least 5, more preferably at least 8, still more preferably at least 10, particularly preferably at least 15. In addition, the mass ratio of the component (D-1) to the component (D-2) is preferably at most 100, more preferably at most 80, at most 70, at most 60, or at most 50. This is because of the following reasons: when the mass ratio is more than the lower limit, a low-density sponge having a uniform and fine open-cell structure can be formed; meanwhile, when the mass ratio is less than the upper limit, the component (C) can be dispersed in the component (A) and the component (B) with satisfactory stability, and as a result, a sponge having a uniform and fine open-cell structure can be formed.

The content of the component (D) falls within the range of from 0.1 part by mass to 15 parts by mass, preferably falls within the range of from 0.2 part by mass to 3 parts by mass with respect to 100 parts by mass of the component (A). This is because of the following reasons: when the content of the component (D) is equal to or more than a lower limit for the range, a sponge having a uniform and fine open-cell structure can be formed; meanwhile, when the content is equal to or less than an upper limit for the range, a silicone rubber sponge excellent in heat resistance can be formed.

The component (E) is the hydrosilylation reaction catalyst for accelerating the hydrosilylation reaction of the composition, and examples thereof include a platinum-based catalyst, a palladium-based catalyst, and a rhodium-based catalyst. Of those, a platinum-based catalyst is preferred. Examples of such component (E) include: chloroplatinic acid; an alcohol-modified chloroplatinic acid; a coordination compound of chloroplatinic acid and an olefin, vinylsiloxane, or an acetylene compound; a coordination compound of platinum and an olefin, vinylsiloxane, or an acetylene compound; tetrakis(triphenylphosphine)palladium; and chlorotris(triphenylphosphine) rhodium.

The content of the component (E) is an amount enough to cross-link the composition. Specifically, the content is preferably such an amount that the content of a catalytic metal in the component (E) falls within the range of from 0.01 ppm to 500 ppm in terms of a mass with respect to the total amount of the component (A) and the component (B), and is more preferably such an amount that the content falls within the range of from 0.1 ppm to 100 ppm.

(F) The curing retarder may be incorporated for adjusting the curing rate and working pot life of the composition. Examples of such component (F) include alkyne alcohols, such as 3-methyl-1-butyn-3-ol, 3,5-dimethyl-1-hexyn-3-ol, 3-phenyl-1-butyn-3-ol, and 1-ethynyl-1-cyclohexanol. The content of the component (F), which is appropriately selected in accordance with the use method and molding method of the composition, generally falls within the range of from 0.001 part by mass to 5 parts by mass with respect to 100 parts by mass of the component (A).

(G) Reinforcing silica fine powder may be further incorporated into the composition in terms of an improvement in strength of the silicone rubber sponge to be obtained. Such component (G) is silica fine powder having a BET specific surface area of preferably from 50 $m^2/g$ to 350 $m^2/g$, more preferably from 80 $m^2/g$ to 250 $m^2/g$, and examples thereof include fumed silica and precipitated silica. In addition, such silica fine powder may be subjected to surface treatment with an organosilane or the like.

The content of the component (G) is at most 20 parts by mass, preferably at most 15 parts by mass, more preferably at most 10 parts by mass with respect to 100 parts by mass of the component (A). In addition, the content of the component (G) is preferably at least 0.1 part by mass with respect to 100 parts by mass of the component (A).

A pigment, such as red oxide, may be incorporated into the composition to the extent that the objects of the present invention are not impaired.

The composition can be easily produced by uniformly mixing the respective components or a composition obtained by blending the components with various additives as required with known kneading means. Examples of a mixer to be used here include a homomixer, a paddle mixer, a homodisper, a colloidmill, a vacuummixing/stirring mixer, and a rotation-revolution mixer. However, the mixer is not particularly limited as long as the component (C) and the component (D) can be sufficiently dispersed in the component (A).

<<2. Silicone Foam Sheet Composite>>

A silicone foam sheet composite of the present invention includes the silicone foam sheet of the present invention. A silicone foam sheet composite according to one embodiment of the present invention is configured so as to include a support on one surface side of the sheet. A silicone foam sheet composite according to another embodiment of the present invention is configured so as to include a support on each of both surface sides thereof.

Any appropriate support may be adopted as the support as long as the support can support the silicone foam sheet of the present invention. Examples of such support include: a plastic film, sheet, or tape; paper; a nonwoven fabric; a metal foil or a metal mesh; and a glass or a glass cloth. When the silicone foam sheet according to the embodiment is configured so as to be free of any member on both surface sides thereof, a release liner is given as a preferred example of the support. In addition, a pressure-sensitive adhesive layer to be described later may be arranged on the support.

The thickness of the release liner is preferably from 1 μm to 500 μm, more preferably from 3 μm to 450 μm, still more preferably from 5 μm to 400 μm, particularly preferably from 10 μm to 300 μm.

The release liner is, for example, a release liner obtained by subjecting the surface of a base material (liner base material), such as a polytetrafluoroethylene (PTFE) film, paper, or a plastic film, to silicone treatment or fluorinated silicone treatment. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyethylene naphthalate film, a polyurethane film, an ethylene-vinyl acetate copolymer film, a polyimide film, a polyamide (nylon) film, and an aromatic polyamide (aramid) film.

The release liner may be used as a base material (a base material A or a base material B) to be described later.

When the silicone foam sheet composite of the present invention includes the release liner, the peel strength of the release liner at a peel angle of 180° and a tensile rate of 300 mm/min is preferably 1 N/50 mm or less, more preferably from 0.01 N/50 mm to 0.7 N/50 mm, still more preferably from 0.02 N/50 mm to 0.5 N/50 mm, particularly preferably from 0.03 N/50 mm to 0.3 N/50 mm at 23° C. When the peel strength of the release liner falls within the range, the release liner sufficiently functions as a support in the silicone foam sheet composite of the present invention including the release liner, and the release liner can be lightly peeled.

The silicone foam sheet composite of the present invention may include a pressure-sensitive adhesive layer on at least one surface side of the sheet. That is, the silicone foam sheet composite of the present invention may include the pressure-sensitive adhesive layer on one surface side thereof, or may include the pressure-sensitive adhesive layer on each of both surface sides thereof.

The silicone foam sheet composite of the present invention may include a support on at least one surface side of the sheet and include a pressure-sensitive adhesive layer on the other surface of the support.

The silicone foam sheet composite of the present invention may include a pressure-sensitive adhesive layer on at least one surface side of the sheet and include a support on the other surface of the pressure-sensitive adhesive layer.

A layer formed of any appropriate pressure-sensitive adhesive may be adopted as the pressure-sensitive adhesive layer. Examples of such pressure-sensitive adhesive include a rubber-based pressure-sensitive adhesive (e.g., a synthetic rubber-based pressure-sensitive adhesive or a natural rubber-based pressure-sensitive adhesive), a urethane-based pressure-sensitive adhesive, an acrylic urethane-based pressure-sensitive adhesive, an acrylic pressure-sensitive adhesive, a silicone-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive, and a fluorine-based pressure-sensitive adhesive. Those pressure-sensitive adhesives may be used alone or in combination thereof.

The pressure-sensitive adhesives are classified into, for example, an emulsion-type pressure-sensitive adhesive, a solvent-type pressure-sensitive adhesive, an ultraviolet-cross-linkable (UV-cross-linkable) pressure-sensitive adhesive, an electron beam-cross-linkable (EB-cross-linkable) pressure-sensitive adhesive, and a hot-melt pressure-sensitive adhesive in terms of a pressure-sensitive adhesion form. Those pressure-sensitive adhesives may be used alone or in combination thereof.

The silicone foam sheet composite of the present invention may be wound into a roll. When the silicone foam sheet composite of the present invention includes the support on each of both surface sides of the sheet, in the case where the composite is wound into a roll, a winding stripe hardly occurs in the roll. When the silicone foam sheet composite of the present invention is configured so as to be free of any member on both surface sides of the sheet (i.e., the configuration of the silicone foam sheet of the present invention) or is configured so as to include the support on one surface side thereof, in the case where the composite is wound into a roll, a winding stripe may easily occur in the roll owing to adsorptivity peculiar to the silicone foam sheet of the present invention. Therefore, when the silicone foam sheet composite of the present invention is produced as a roll, the composite is preferably produced so as to include the support on each of both surface sides of the sheet.

<<3. Method of Producing Silicone Foam Sheet>>

A method of producing a silicone foam sheet according to one embodiment of the present invention is a method of producing a silicone foam sheet having a thickness of from 10 μm to 3,000 μm, including: applying a silicone resin composition containing at least a thermosetting silicone resin and water onto a base material A (the step is hereinafter referred to as "step (1)"); mounting a base material B on the surface of the applied silicone resin composition opposite to the base material A (the step is hereinafter referred to as "step (2)"); thermally curing the silicone resin composition (the step is hereinafter referred to as "step (3)"); and removing the base material A and/or the base material B, followed by heat drying (the step is hereinafter referred to as "step (4)") to form the silicone foam sheet.

A method of producing a silicone foam sheet according to another embodiment of the present invention is a method of producing a silicone foam sheet having a thickness of from 10 μm to 3,000 μm, including: applying a silicone resin composition containing at least a thermosetting silicone resin and water onto a base material A (the step is hereinafter referred to as "step (1)"); mounting a base material B on the surface of the applied silicone resin composition opposite to the base material A (the step is hereinafter referred to as "step (2)"); thermally curing the silicone resin composition (the step is hereinafter referred to as "step (3)"); removing the base material A and/or the base material B, followed by heat drying (the step is hereinafter referred to as "step (4)"); and bonding the resultant to a support (the step is hereinafter referred to as "step (5)") to form the silicone foam sheet.

The base material A to be used in the step (1) and the base material B to be used in the step (2) are each preferably a plastic, metal, or glass sheet or film having no air permeability. As a material for such sheet or film, there are given, for example: olefin-based resins each containing an α-olefin as a monomer component, such as polyethylene (PE), polypropylene (PP), and an ethylene-vinyl acetate copolymer (EVA); polyester-based resins, such as polyethylene terephthalate (PET), polyethylene naphthalate (PEN), and polybutylene terephthalate (PBT); polyvinyl chloride (PVC); vinyl acetate-based resins; polyphenylene sulfide (PPS); amide-based resins, such as polyamide (nylon) and a wholly aromatic polyamide (aramid); polyimide-based resins; polyether ether ketone (PEEK); copper; aluminum; and any appropriate glass. There is also given, for example, a release liner obtained by subjecting the surface of a base material (liner base material), such as a polytetrafluoroethylene (PTFE) film, paper, or a plastic film, to silicone treatment or fluorinated silicone treatment. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyethylene naphthalate film, a polyurethane film, an ethylene-vinyl acetate copolymer film, a polyimide film, a polyamide (nylon) film, and an aromatic polyamide (aramid) film. In the case where there is a base material that is not removed at the time of the heat drying in the step (4), a release liner that may be used as the base material is preferably the release liner obtained by subjecting the surface of the base material (liner base material), such as the polytetrafluoroethylene (PTFE) film, the paper, or the plastic film, to the fluorinated silicone treatment. In the case where there is a base material that is not removed at the time of the heat drying in the step (4), when the release liner obtained by subjecting the surface of the base material (liner base material), such as the polytetrafluoroethylene (PTFE) film, the paper, or the plastic film, to the fluorinated silicone treatment is used as the base material, its peeling after the heat drying can be easily performed. In addition, the pressure-sensitive adhesive layer described in the foregoing may be arranged on the base material A or the base material B.

The base material A to be used in the step (1) and the base material B to be used in the step (2) may be identical to each other, or may be different from each other. In addition, each of the base material A to be used in the step (1) and the base material B to be used in the step (2) may be formed only of one layer, or may be formed of two or more layers.

In accordance with the degree of hydrophilicity or hydrophobicity of the surface of each of the base material A to be used in the step (1) and the base material B to be used in the step (2) in contact with the silicone resin composition, the shape of the surface of the silicone resin composition in contact with the surface changes. For example, when a base material having high hydrophilicity, such as a polyethylene terephthalate (PET) film, is used as the base material A or the base material B, many surface opening portions each having a fine diameter can be caused to be present in the surface of the silicone resin composition in contact with the base material. In addition, for example, when a base material having high hydrophobicity, such as a polyethylene terephthalate (PET) release liner subjected to fluorinated silicone treatment, is used as the base material A or the base material B, a small number of surface opening portions each having a fine diameter can be caused to be present in the surface of the silicone resin composition in contact with the base material. Therefore, when the silicone foam sheet of the present invention is to be caused to express high air permeability or high adsorptivity, a base material having high hydrophilicity is preferably used, and when the silicone foam sheet of the present invention is to be caused to express high cut-off performance or high dust resistance, a base material having high hydrophobicity is preferably used. In addition, when repeelability between the silicone foam sheet of the present invention and a base material is needed, a base material having high hydrophobicity is preferably used. The degree of hydrophilicity or hydrophobicity may be defined by, for example, a contact angle with water. For example, when the contact angle with water is less than 90°, a base material may be defined as being hydrophilic, and when the contact angle with water is 90° or more, the base material may be defined as being hydrophobic.

The thickness of each of the base material A to be used in the step (1) and the base material B to be used in the step (2) is preferably from 1 µm to 500 µm, more preferably from 3 µm to 450 µm, still more preferably from 5 µm to 400 µm, particularly preferably from 10 µm to 300 µm. When the thickness of each of the base material A to be used in the step (1) and the base material B to be used in the step (2) is set within the range, the silicone foam sheet of the present invention can be efficiently produced.

In the step (3), the silicone resin composition is thermally cured. The temperature of the heat curing is preferably 50° C. or more and less than 100° C. because the silicone resin composition can be thermally cured with efficiency. When the temperature of the heat curing is less than 50° C., it may take too long time to perform the heat curing. When the temperature of the heat curing is 100° C. or more, moisture in the silicone resin composition sandwiched between the base material A and the base material B to be brought into a substantially closed state may volatilize to cause the coarsening of cells to be formed or an increase in density thereof. A product formed from the silicone resin composition by the step (3) is referred to as "silicone foam sheet precursor."

When a special heat curing method in which the silicone resin composition is thermally cured while being sandwiched between the base material A and the base material B to be brought into a substantially closed state like the step (3) is performed, the silicone resin composition is thermally cured under a state in which the moisture therein is not removed, and in cooperation with the subsequent step (4), the silicone foam sheet of the present invention having an open-cell structure and fine cell diameters can be effectively obtained.

In the step (4), a product obtained by removing the base material A and/or the base material B is subjected to heat drying. The removal of the base material A and/or the base material B releases the substantially closed state in the step (3), and the heat drying in the released state efficiently volatilizes and removes the moisture from the silicone foam sheet precursor formed in the step (3) to provide the silicone foam sheet of the present invention. A heat drying temperature in the step (4) is preferably from 120° C. to 250° C. because the silicone foam sheet of the present invention can be effectively formed. When the heat drying temperature in the step (4) is less than 120° C., it may take too long time to perform the drying and the curing, and the silicone foam sheet of the present invention having an open-cell structure and fine cell diameters may not be obtained. When the heat drying temperature in the step (4) is more than 250° C., it may become difficult to form the sheet owing to the shrinkage or expansion of a base material.

In the step (5), after the step (4), the resultant is bonded to the support to form the silicone foam sheet.

The silicone foam sheet of the present invention described in the section <<1. Silicone Foam Sheet>> is preferably produced by the method of producing a silicone foam sheet of the present invention.

EXAMPLES

Now, the present invention is described specifically by way of Examples. However, the present invention is by no means limited to Examples. Test and evaluation methods in Examples and the like are as described below. The term "part(s)" in the following description means "part(s) by mass" unless otherwise specified, and the term "%" in the following description means "mass o" unless otherwise specified.

<Measurement of Sheet Thickness>

Measurement was performed with a thickness gauge JA-257 (terminal size: 20 mmφ in each of upper and lower terminals) (manufactured by Ozaki MFG. Co., Ltd.).

<Measurement of Cell Diameter>

An average cell diameter (μm) was determined by capturing an enlarged image of a section of a foam (foam sheet) with a low-vacuum scanning electron microscope ("S-3400N Scanning Electron Microscope," manufactured by Hitachi High-Tech Science Systems Corporation) and analyzing the image. The number of analyzed cells is 20. The minimum cell diameter (μm) and maximum cell diameter (μm) of the foam (foam sheet) were each determined by the same method.

<Measurement of Apparent Density>

A foam (foam sheet) was punched with a punching blade die measuring 100 mm by 100 mm, and the dimensions of the punched sample were measured. In addition, its thickness was measured with a 1/100 dial gauge in which the diameter (φ) of a measurement terminal was 20 mm. The volume of the foam (foam sheet) was calculated from those values.

Next, the mass of the foam (foam sheet) was measured with an even balance having a minimum scale of 0.01 g or more. The apparent density (g/cm$^3$) of the foam (foam sheet) was calculated from those values.

<Observation of Cell Structure (Whether or not Open-Cell Structure is Present)>

An enlarged image of a section of a foam (foam sheet) was captured with a low-vacuum scanning electron microscope ("S-3400N Scanning Electron Microscope," manufactured by Hitachi High-Tech Fielding Corporation), and the presence or absence of a through-hole of a cell wall was confirmed.

<Measurement of Open-cell Ratio>

An open-cell ratio was measured as described below.

That is, a foam (foam sheet) was sunk in water, and was left to stand under a reduced pressure of −750 mmHg for 3 minutes so that air in its bubbles was replaced with the water. The mass of the absorbed water was measured, and the volume of the absorbed water was calculated by defining the density of the water as 1.0 g/cm$^3$, followed by the calculation of the open-cell ratio from the following equation.

$$\text{Open-cell ratio (\%)} = \{(\text{volume of absorbed water})/(\text{volume of bubble portions})\} \times 100$$

The volume of the bubble portions was calculated from the following equation.

$$\text{Volume (cm}^3\text{) of bubble portions} = \{(\text{mass of foam (foam sheet)})/(\text{apparent density of foam (foam sheet)})\} - \{(\text{mass of foam (foam sheet)})/(\text{resin density})\}$$

The resin density is a value obtained by measuring the density of a resin molded body produced by removing an emulsifying agent in a resin forming the foam.

<Measurement of Average Pore Diameter of Surface Opening Portions>

The average pore diameter (μm) of surface opening portions was determined by capturing an enlarged image of the surface of a foam (foam sheet) with a low-vacuum scanning electron microscope ("S-3400N Scanning Electron Microscope," manufactured by Hitachi High-Tech Fielding Corporation) and analyzing the image. The number of analyzed pores is 20.

<Measurement of Storage Moduli of Elasticity (−30° C., 20° C., 150° C., and Change Ratio)>

A temperature dispersibility test was performed in the film tensile measurement mode of a viscoelasticity-measuring apparatus ("ARES-2KFRTN1-FCO," manufactured by TA Instruments Japan Inc.) at an angular frequency of 1 rad/s, and a storage modulus of elasticity E' at −30° C., 20° C., or 150° C. at that time was measured, followed by the determination of a change ratio when the storage modulus of elasticity at 20° C. was defined as a reference from the following equation.

$$\text{Change Ratio (\%)} = \{(\text{storage modulus of elasticity at } -30° \text{ C.}) - (\text{storage modulus of elasticity at } 150° \text{ C.})\}/(\text{storage modulus of elasticity at } 20° \text{ C.}) \times 100$$

<Measurement of Compression Sets (−30° C., 20° C., and 150° C.)>

A sample measuring 50 mm long by 50 mm wide by L mm thick was arranged in parallel with a spacer having a thickness corresponding to 50% of the thickness of the sample ((½) L mm), and was set and sandwiched between two SUS plates. After that, the sample was compressed to the thickness of the spacer and fixed to produce a test body in a 50% compressed state. The test body was left to stand under each of the temperature conditions of −30° C., 20° C., and 150° C. for 22 hours. After that, the test body was released from the compressed state under room temperature, and its compression set was calculated from its thickness 30 minutes after the release. A calculation equation is as described below.

$$\text{Compression set (\%)} = \{(d0-d2)/(d0-d1)\} \times 100$$

d0: The original thickness (mm) of the sample
d1: The thickness (mm) of the spacer
d2: The thickness (mm) of the sample 30 minutes after the release from the compressed state under room temperature <Measurement of Peel Strength of Release Liner>

A peel strength at the time of the peeling of a release liner from a sample having a width of 50 mm with Tensilon at a peel angle of 180° and a tensile rate of 300 mm/min was measured.

<Evaluation of Bubble Removability>

A sample was bonded to a SUS304BA plate, and its adhesive property and bubble removability at the time of one reciprocation of a 2-kilogram roller were evaluated.

o: The sample is bonded to the plate without the inclusion of bubbles.
x: The sample is bonded to the plate with the inclusion of bubbles, or is not bonded thereto.

<Evaluation of Cut-Off Performance>

A sample was punched with an inner frame measuring 43 mm by 33.5 mm and an outer frame measuring 45 mm by 35.5 mm to produce a window frame-shaped sample having a width of 1 mm. The sample was set on a polycarbonate plate, and a spacer was set outside the sample so that a compressibility of 25% was achieved. A sheet whose color was changed by water absorption was set in the sample, and a polycarbonate plate was mounted from above the sample. That is, the sample was sandwiched between the two polycarbonate plates, and was fixed with a bolt so that a compressibility of 25% was achieved. The resultant was immersed in a water bath having a water depth of 1 m for 30 minutes, and the flooded state of the inside of the sample was evaluated on the basis of the color of the sheet whose color was changed by water absorption in the sample.
o: No flooding occurs.
x: Flooding occurs.
<Measurement of Shear Adhesive Strength>

A SUS304BA plate was bonded to each of both surfaces of a sample measuring 30 mm long by 30 mm wide at such a position that the center line of the sample and the center line of the SUS304BA plate coincided with each other, and a 2-kilogram roller was reciprocated once to pressure-bond the sample and the plates together. 30 Minutes after the pressure bonding, the resultant test body was set in a tensile tester so that the center line of the sample and the center line of a clamp were present on one straight line, and a force was applied to the sample in a direction parallel to the center line of the sample. A maximum load required for the test body to rupture at the time of its pulling at 23° C. and a tensile rate of 50 mm/min was measured. The number of times of the test was set to five, and the average of the five measured values was determined. The shear adhesive strength of the sample was measured by subjecting the average to proportional conversion into a value per 100 $mm^2$.

Example 1

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.35 parts by mass of smectite clay (aqueous additive, purified bentonite composited with an organic polymer, manufactured by Hojun Co., Ltd.), 148.65 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a silicone foam sheet (1) having a thickness of 200 μm and an apparent density of 0.45 $g/cm^3$. The results of the various measurements of the resultant silicone foam sheet (1) and the results of the evaluations thereof are shown in Table 1.

Example 2

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.85 part by mass of smectite clay (aqueous additive, purified bentonite composited with an organic polymer, manufactured by Hojun Co., Ltd.), 99.15 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a silicone foam sheet (2) having a thickness of 200 μm and an apparent density of 0.57 $g/cm^3$. The results of the various measurements of the resultant silicone foam sheet (2) and the results of the evaluations thereof are shown in Table 1.

Example 3

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.65 parts by mass of smectite clay (aqueous additive, purified bentonite composited with an organic polymer, manufactured by Hojun Co., Ltd.), 192.47 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 15 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a silicone foam sheet (3) having a thickness of 200 µm and an apparent density of 0.37 g/cm$^3$. The results of the various measurements of the resultant silicone foam sheet (3) and the results of the evaluations thereof are shown in Table 1.

Example 4

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.98 parts by mass of smectite clay (aqueous additive, purified bentonite composited with an organic polymer, manufactured by Hojun Co., Ltd.), 231.35 parts by mass of ion-exchanged water, 6.50 parts by mass of fumed silica having a BET specific surface area of 225 m$^2$/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 20 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a silicone foam sheet (4) having a thickness of 200 µm and an apparent density of 0.36 g/cm$^3$. The results of the various measurements of the resultant silicone foam sheet (4) and the results of the evaluations thereof are shown in Table 1.

Comparative Example 1

100 Parts by mass of an acrylic emulsion solution (solid content: 55%, ethyl acrylate-butyl acrylate-acrylonitrile copolymer (mass ratio=45:48:7)), 2 parts by mass of a fatty acid ammonium-based surfactant (aqueous dispersion of ammonium stearate, solid content: 33%) (surfactant A), 2 parts by mass of a carboxybetaine-type amphoteric surfactant ("AMOGEN CB-H," manufactured by DKS Co., Ltd.) (surfactant B), 4 parts by mass of an oxazoline-based cross-linking agent ("EPOCROS WS-500," manufactured by Nippon Shokubai Co., Ltd., solid content: 39%), 1 part by mass of a pigment (carbon black) ("NAF-5091," manufactured by Dainichiseika Color & Chemicals Mfg. Co., Ltd.), and 0.6 part by mass of a polyacrylic acid-based thickener (ethyl acrylate-acrylic acid copolymer (acrylic acid: 20 mass %), solid content: 28.7%) were stirred and mixed with a disper ("ROBOMIX," manufactured by PRIMIX Corporation) to be foamed. The foamed composition was applied onto a polyethylene terephthalate (PET) film subjected to peeling treatment (thickness: 38 µm, product name: "MRF #38," manufactured by Mitsubishi Plastics, Inc.), and was dried at 70° C. for 4.5 minutes and then at 140° C. for 4.5 minutes. Thus, a foam sheet (C1) having a thickness of 200 µm and an apparent density of 0.31 g/cm$^3$ was obtained. The results of the various measurements of the resultant foam sheet (C1) and the results of the evaluations thereof are shown in Table 2.

Comparative Example 2

A commercial polypropylene-based foam ("SCF 400T," manufactured by Nitto Denko Corporation) was used as a foam sheet (C2). The foam sheet (C2) had a thickness of 200 µm and a density of 0.065 g/cm$^3$. The results of the various measurements of the resultant foam sheet (C2) and the results of the evaluations thereof are shown in Table 2.

Comparative Example 3

A commercial polyethylene-based foam ("Volara XLIM WL02," manufactured by Sekisui Chemical Co., Ltd.) was used as a foam sheet (C3). The foam sheet (C3) had a thickness of 200 µm and a density of 0.18 g/cm$^3$. The results of the various measurements of the resultant foam sheet (C3) and the results of the evaluations thereof are shown in Table 2.

Comparative Example 4

100 Parts by mass of a styrene-butadiene rubber emulsion ("AH748-M4," manufactured by Emulsion Technology Co., Ltd., solid content: 66.1%) and 2 parts by mass of a vulcanizing agent ("FB-2," manufactured by Emulsion Technology Co., Ltd., solid content: 56%) were stirred and mixed with a disper ("ROBOMIX," manufactured by PRIMIX Corporation) to be foamed. The foamed composition was applied onto a PET film subjected to peeling treatment (thickness: 38 µm, product name: "MRF #38," manufactured by Mitsubishi Plastics, Inc.), and was dried at 70° C. for 4.5 minutes and then at 140° C. for 4.5 minutes. Thus, a foam sheet (C4) having a thickness of 200 µm, a density of 0.27 g/cm$^3$, and an average cell diameter of 130 μm was obtained. The results of the various measurements of the resultant foam sheet (C4) and the results of the evaluations thereof are shown in Table 2.

Comparative Example 5

A commercial silicone-based foam ("NanNex HT-800," manufactured by Rogers Inoac Corporation) was used as a foam sheet (C5). The foam sheet (C5) had a thickness of 800 μm and a density of 0.32 g/cm$^3$.

The results of the various measurements of the resultant foam sheet (C5) and the results of the evaluations thereof are shown in Table 2.

TABLE 1

|  |  | Example 1 | Example 2 | Example 3 | Example 4 |
|---|---|---|---|---|---|
| Material |  | Silicone | Silicone | Silicone | Silicone |
| Sheet thickness (μm) |  | 200 | 200 | 200 | 200 |
| Open-cell ratio (%) |  | 100 | 100 | 100 | 100 |
| Cell diameter (μm) | Average cell diameter | 10 | 12 | 17 | 16 |
|  | Maximum cell diameter | 50 | 22 | 23 | 25 |

TABLE 1-continued

|  |  | Example 1 | Example 2 | Example 3 | Example 4 |
|---|---|---|---|---|---|
|  | Minimum cell diameter | 2 | 8 | 12 | 11 |
| Apparent density (g/cm$^3$) |  | 0.45 | 0.57 | 0.37 | 0.36 |
| Average pore diameter of surface opening portions (μm) |  | 5.0 | 2.0 | 0.8 | 0.3 |
| Storage modulus of elasticity | −30° C. (Pa) | 7.0 × 10$^5$ | 1.2 × 10$^6$ | 5.6 × 10$^5$ | 4.0 × 10$^5$ |
|  | 20° C. (Pa) | 6.7 × 10$^5$ | 1.2 × 10$^6$ | 3.4 × 10$^5$ | 3.7 × 10$^5$ |
|  | 150° C. (Pa) | 5.2 × 10$^5$ | 1.5 × 10$^6$ | 6.5 × 10$^5$ | 6.8 × 10$^5$ |
|  | Change ratio (%) | 28 | −34 | −28 | −77 |
| Compression set (%) | −30° C. | 0 | 2 | 0 | 0 |
|  | 20° C. | 0 | 0 | 0 | 0 |
|  | 150° C. | 12 | 14 | 7 | 12 |
| Bubble removability |  | ○ | ○ | ○ | ○ |
| Cut-off performance (corresponding to IPX-7) |  | ○ | ○ | ○ | ○ |
| Shear adhesive strength (N/100 mm$^2$) |  | 6.4 | 3.8 | 14.4 | 15.1 |

TABLE 2

|  |  | Comparative Example 1 | Comparative Example 2 | Comparative Example 3 | Comparative Example 4 | Comparative Example 5 |
|---|---|---|---|---|---|---|
| Material |  | Acrylic | PP | PE | SBR | Silicone |
| Sheet thickness (μm) |  | 200 | 200 | 200 | 200 | 800 |
| Open-cell ratio (%) |  | 100 | 90 | 1 | 100 | 10 |
| Cell diameter (μm) | Average cell diameter | 80 | 80 | 160 | 130 | 700 |
|  | Maximum cell diameter | 150 | 100 | 280 | 190 | 800 |
|  | Minimum cell diameter | 40 | 40 | 40 | 100 | 550 |
| Apparent density (g/cm$^3$) |  | 0.31 | 0.065 | 0.18 | 0.27 | 0.32 |
| Average pore diameter of surface opening portions (μm) |  | 25 | 100 | 20 | 50 | 0 (None) |
| Storage modulus of elasticity | −30° C. (Pa) | 3.2 × 10$^8$ | 4.5 × 10$^7$ | 2.6 × 10$^8$ | 1.1 × 10$^6$ | 3.8 × 10$^5$ |
|  | 20° C. (Pa) | 9.7 × 10$^5$ | 4.1 × 10$^6$ | 1.9 × 10$^7$ | 3.8 × 10$^5$ | 2.4 × 10$^5$ |
|  | 150° C. (Pa) | 3.5 × 10$^5$ | 8.2 × 10$^4$ | 1.6 × 10$^5$ | 1.8 × 10$^5$ | 1.3 × 10$^5$ |
|  | Change ratio (%) | 32,592 | 1,081 | 1,362 | 244 | 103 |
| Compression set (%) | −30° C. | 0 | 6 | 8 | 0 | 0 |
|  | 20° C. | 0 | 30 | 12 | 1 | 0 |
|  | 150° C. | 39 | 100 | 51 | 83 | 5 |
| Bubble removability |  | ○ | x (no adhesive property) | x (no adhesive property) | ○ | x (inclusion of bubbles) |
| Cut-off performance (corresponding to IPX-7) |  | x | x | x | x | ○ |
| Shear adhesive strength (N/100 mm$^2$) |  | 6.5 | 0 | 0 | 5.1 | 0.8 |

Example 5

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.35 parts by mass of smectite clay (aqueous additive, purified bentonite composited with an organic polymer, manufactured by Hojun Co., Ltd.), 148.65 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a PET film (Lumirror S10, manufactured by Toray Industries, Inc.) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a laminate of a silicone foam sheet having a thickness of 200 μm and an apparent density of 0.45 $g/cm^3$ and a PET film.

Example 6

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.35 parts by mass of smectite clay (aqueous additive, purified bentonite composited with an organic polymer, manufactured by Hojun Co., Ltd.), 148.65 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes. After the drying, the resultant was bonded to a silicone pressure-sensitive adhesive free of a base material to provide a laminate of a silicone foam sheet having a thickness of 200 μm and an apparent density of 0.45 $g/cm^3$ and a silicone pressure-sensitive adhesive.

Example 7

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.85 part by mass of smectite clay (aqueous additive, purified bentonite composited with an organic polymer, manufactured by Hojun Co., Ltd.), 99.15 parts by mass of ion-exchanged water, 6.50 parts by mass of fumed silica having a BET specific surface area of 225 $m^2/g$, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a PET film (Lumirror S10, manufactured by Toray Industries, Inc.) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a laminate of a silicone foam sheet having a thickness of 200 μm and an apparent density of 0.57 $g/cm^3$ and a PET film.

Example 8

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.85 part by mass of smectite clay (aqueous additive, purified bentonite composited with an organic polymer, manufactured by Hojun Co., Ltd.), 99.15 parts by mass of ion-exchanged water, 6.50 parts by mass of fumed silica having a BET specific surface area of 225 m$^2$/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 6 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes. After the drying, the resultant was bonded to a silicone pressure-sensitive adhesive free of a base material to provide a laminate of a silicone foam sheet having a thickness of 200 μm and an apparent density of 0.57 g/cm$^3$ and a silicone pressure-sensitive adhesive.

Example 9

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.65 parts by mass of smectite clay (aqueous additive, purified bentonite composited with an organic polymer, manufactured by Hojun Co., Ltd.), 192.47 parts by mass of ion-exchanged water, 6.50 parts by mass of fumed silica having a BET specific surface area of 225 m$^2$/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 15 minutes. Next, the emulsified liquid was dried under reduced pressure at room temperature for 5 minutes to be defoamed. The liquid was applied onto a PET film (Lumirror S10, manufactured by Toray Industries, Inc.) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a laminate of a silicone foam sheet having a thickness of 200 μm and an apparent density of 0.37 g/cm$^3$ and a PET film.

Example 10

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.65 parts by mass of smectite clay (aqueous additive, purified bentonite composited with an organic polymer, manufactured by Hojun Co., Ltd.), 192.47 parts by mass of ion-exchanged water, 6.50 parts by mass of fumed silica having a BET specific surface area of 225 m$^2$/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 15 minutes. Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes. After the drying, the resultant was bonded to a silicone pressure-sensitive adhesive free of a base material to provide a laminate of a silicone foam sheet having a thickness of 200 μm and an apparent density of 0.37 g/cm$^3$ and a silicone pressure-sensitive adhesive.

Example 11

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.98 parts by mass of smectite clay (aqueous additive, purified bentonite composited with an organic polymer, manufactured by Hojun Co., Ltd.), 231.35 parts by mass of ion-exchanged water, 6.50 parts by mass of fumed silica having a BET specific surface area of 225 m²/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 20 minutes. Next, the emulsified liquid was dried under reduced pressure at room temperature for 5 minutes to be defoamed. The liquid was applied onto a PET film (Lumirror S10, manufactured by Toray Industries, Inc.) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes to provide a laminate of a silicone foam sheet having a thickness of 200 μm and an apparent density of 0.36 g/cm³ and a PET film.

Example 12

83.45 Parts by mass of dimethylpolysiloxane having a vinyl group content of 0.28 mass %, 6.40 parts by mass of methylhydrogenpolysiloxane having a silicon atom-bonded hydrogen atom content of 0.7 mass % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 1.98 parts by mass of smectite clay (aqueous additive, purified bentonite composited with an organic polymer, manufactured by Hojun Co., Ltd.), 231.35 parts by mass of ion-exchanged water, 6.50 parts by mass of fumed silica having a BET specific surface area of 225 m²/g, the fumed silica having been subjected to surface treatment with hexamethyldisilazane, 2.40 parts by mass of red oxide (product name: BAYFERROX, manufactured by Bayer AG), 0.98 part by mass of a nonionic surfactant (sorbitan fatty acid ester, product name: RHEODOL SP-O10V, manufactured by Kao Corporation, HLB: 4.3), 0.045 part by mass of a nonionic surfactant (sorbitan fatty acid ester, product name: RHEODOL SP-030V, manufactured by Kao Corporation, HLB: 1.8), 0.02 part by mass of 1-ethynyl-1-cyclohexanol, and 0.22 part by mass of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation) for 20 minutes. Next, the emulsified liquid was dried under reduced pressure at room temperature for 5 minutes to be defoamed. The liquid was applied onto a fluorosilicone-treated PET film (NIPPA SHEET PET38× 1-SS4A, manufactured by Nippa) with an applicator, and a fluorosilicone-treated PET film (NIPPA SHEET PET38×1-SS4A, manufactured by Nippa) was mounted from above the liquid, followed by heating with a hot-air oven at 85° C. for 6 minutes to cure a silicone resin. After the curing, the fluorosilicone-treated PET film on one side was peeled, and heat drying was performed at 200° C. for 3 minutes. After the drying, the resultant was bonded to a silicone pressure-sensitive adhesive free of a base material to provide a laminate of a silicone foam sheet having a thickness of 200 μm and an apparent density of 0.36 g/cm³ and a silicone pressure-sensitive adhesive.

INDUSTRIAL APPLICABILITY

The silicone foam sheet of the present invention can express excellent bubble removability, has satisfactory adhesiveness with an adherend, has satisfactory sealability, can maintain the expression of these effects even when its thickness is reduced, can preferably express a stable modulus of elasticity over a region from a low-temperature region to a high-temperature region, and can suppress both of its compression set in the low-temperature region and its compression set in the high-temperature region to low levels. Accordingly, the silicone foam sheet of the present invention can be utilized in various applications requiring those characteristics.

The invention claimed is:
1. A silicone foam sheet having a thickness of from 10 μm to 3,000 μm,
   wherein the silicone foam sheet has an open-cell structure,
   wherein an open-cell ratio of the silicone foam sheet is 90% or more,
   wherein an average cell diameter of the silicone foam sheet is from 1 μm to 50 μm,
   wherein 90% or more of all cells in the silicone foam sheet each have a cell diameter of 80 μm or less,
   wherein the silicone foam sheet is formed by heat curing of a silicone resin composition,
   wherein the silicone resin composition comprises at least:
   (A) 100 parts by mass of an organopolysiloxane having at least two alkenyl groups in a molecule thereof;
   (B) an organopolysiloxane having at least two silicon atom-bonded hydrogen atoms in a molecule thereof in such an amount that a number of moles of the silicon atom-bonded hydrogen atoms in the component (B) is from 0.4 mol to 20 mol with respect to 1 mol of the alkenyl groups in the component (A);
   (C) 100 parts by mass to 1,000 parts by mass of a mixture including water and an inorganic thickener;
   (D) 0.1 part by mass to 15 parts by mass of surfactants including (D-1) a nonionic surfactant having an HLB value of 3 or more and (D-2) a nonionic surfactant having an HLB value of less than 3, provided that a mass ratio of the component (D-1) to the component (D-2) is at least 1;
   (E) a hydrosilylation reaction catalyst; and
   (F) 0.001 part by mass to 5 parts by mass of a curing retarder, and
   wherein a shear adhesive strength (23° C., tensile rate: 50 mm/min) of the silicone foam sheet with a SUS304BA plate is 1 N/100 mm² or more.
2. The silicone foam sheet according to claim 1, wherein the thickness is less than 800 μm.
3. The silicone foam sheet according to claim 1, wherein a storage modulus of elasticity of the silicone foam sheet in a range of from −30° C. to 150° C. falls within a range of from −200% to +200% with respect to a storage modulus of elasticity of the silicone foam sheet at 20° C.

4. The silicone foam sheet according to claim 1, wherein both a compression set of the silicone foam sheet at −30° C. and a compression set of the silicone foam sheet at 150° C. are 50% or less.

5. A silicone foam sheet composite, comprising a support on at least one surface side of the silicone foam sheet of claim 1.

6. The silicone foam sheet composite according to claim 5, wherein the support comprises a release liner.

7. The silicone foam sheet composite according to claim 6, wherein a peel strength of the release liner at a peel angle of 180° and a tensile rate of 300 mm/min is 1 N/50 mm or less at 23° C.

8. The silicone foam sheet composite according to claim 5, wherein the silicone foam sheet composite is wound into a roll.

9. A silicone foam sheet composite, comprising a pressure-sensitive adhesive layer on at least one surface side of the silicone foam sheet of claim 1.

10. A silicone foam sheet composite, comprising:
a support on at least one surface side of the silicone foam sheet of claim 1; and
a pressure-sensitive adhesive layer on another surface of the support.

11. A silicone foam sheet composite, comprising:
a pressure-sensitive adhesive layer on at least one surface side of the silicone foam sheet of claim 1; and
a support on another surface of the pressure-sensitive adhesive layer.

* * * * *